Nov. 8, 1955 P. H. ROGERS ET AL 2,723,013
UNIDIRECTIONAL, ONE-WAY AUTOMATIC SPRING CLUTCH
Filed April 9, 1952
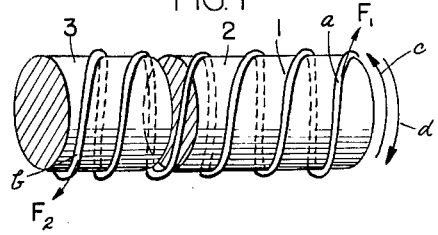
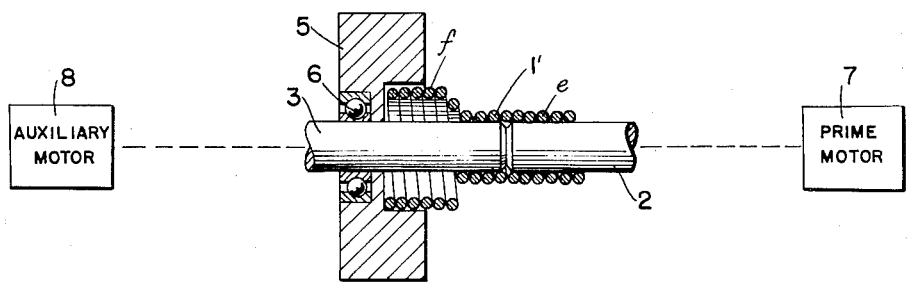
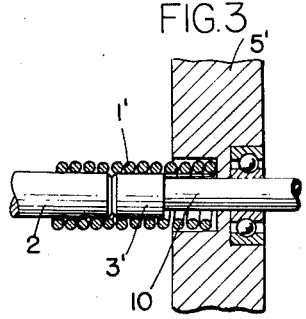   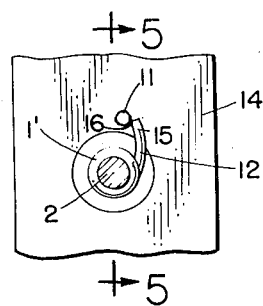
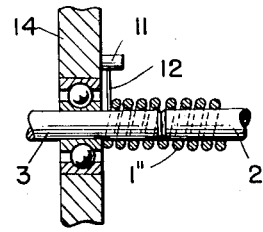
INVENTORS:
PAUL H. ROGERS
RICHARD H. RICHWINE
BY
ATT'YS.

2,723,013

UNIDIRECTIONAL, ONE-WAY AUTOMATIC SPRING CLUTCH

Paul H. Rogers, Fort Walton, Fla., and Richard H. Richwine, Greenfield, Ind.

Application April 9, 1952, Serial No. 281,448

6 Claims. (Cl. 192—41)

(Granted under Title 35, U. S. Code (1952), sec. 266)

This invention relates to a spring clutch mechanism and more particularly relates to a spring clutch which operates to transfer motion in only a single direction.

The spring clutches, as found in the prior art, for the most part perform the function of transferring motion from one rotatable shaft to another rotatable shaft through a spiral spring which is in a slide-fit relation with the two shafts to be coupled. When the drive shaft of such a mechanism is rotated in a direction opposite to the direction of spiral of the spring, the spring tightens against the two shafts thereby transmitting motion. If the power driving shaft was suddenly cut off, such a spring clutch arrangement would automatically disconnect the driven shaft from the driving shaft since the relative motion between the driving and driven shaft is thereby reversed which loosens the spring. Such a spring clutch mechanism is disclosed in U. S. Patent 2,300,712 granted November 3, 1942 to W. E. Starkey. In such a mechanism, if the driven shaft is rotated by some external force in a direction opposite to the direction of the spiral, this motion will be transmitted back to the drive shaft.

There are many circumstances where such an action is undesirable. Thus, there are instances where it is desired to completely uncouple a driven shaft from a drive shaft irrespective of what direction the driven shaft might be directly rotated relative to the drive shaft.

Accordingly, one object of the instant invention is to provide a novel spring clutch in which motion may be transmitted in only one direction.

Another object of the instant invention is to provide a novel spring clutch mechanism which is simple of construction and capable of disconnecting a driven shaft from a drive shaft instantaneously when it is desired to rotate the driven shaft from a different power source.

Still another object of the instant invention is to provide a simple and efficient spring clutch device which is uni-directional in character.

Very generally, a broad feature of the instant invention includes a spring clutch comprising a coil spring, a drive shaft positioned in one end of the spring, a shaft to be driven by said driven shaft positioned in the other end of the spring, and a brake means associated with the end of the spring disposed over the driven shaft adapted to prevent the spring from rotating when the drive shaft is rotated from an external power source in a direction which would normally tighten the spring on both shafts.

A specific aspect of the instant invention is in providing a spring clutch comprising a spiral spring having a portion thereof which normally engage both the driven and the driving shaft, and another portion on one end thereof which is displaced from the driven shaft, and a stationary collar surrounding and engaging this latter spring portion which tightly engages the spring thereby preventing it from rotating when the driven shaft is rotated in a direction by an external power source which would tend to tighten the portion of the spring directly engaging the driven and drive shaft.

Another more specific feature of the instant invention is in providing a spiral spring having one section of a fixed diameter which engages both the driven and the driving shaft and another portion on the end of the spring adjacent the driven shaft which has a diameter substantially greater than the shaft adjacent thereto, and a fixed housing surrounding the larger portion of said spring which normally loosely engages the portion of the spring having the larger diameter but which tightly abuts against the house whenever the driven shaft is rotated by an external force in a direction which would tend to tighten the said portion of the spring engaging the shaft.

Other features and objects of the instant invention will become more apparent upon making reference to the specification to follow and drawings wherein:

Figure 1 is a diagram of a spiral spring coupled between two shafts used to explain the clutch action of a spiral spring;

Figure 2 is a partial cross-sectional view of the preferred embodiment of the instant invention;

Figure 3 is a partial cross-sectional view of another embodiment of the instant invention;

Figure 4 is an elevational view of still another embodiment of the instant invention; and Figure 5 is a cross-sectional view taken along section plane 5—5 in Figure 4.

Referring now more particularly to Figure 1, the clutch device there shown comprises a spiral spring 1 wound about a drive shaft 2 and a driven or follower shaft 3. If a force $F_1$ is applied upwardly on portion $a$ of spiral 1 and a force $F_2$ is applied downwardly along portion $b$ of spiral spring 1, then the spring will contract and will grip the shaft more tightly. Conversely, if forces are applied in the opposite direction to those just shown, then the spring will tend to expand and thereby be loosened from gripping contact with the shaft.

To aid in relating the direction of rotation of the shafts to the direction of spiral of spring 1, assume that the direction of arrow $c$ in Figure 1 represents a counterclockwise direction of shaft 2 and the direction of the arrow $d$ represents a clockwise direction of rotation of shaft 2. These directions, $c$ and $d$, are thus determined by looking down the driven shaft toward the driving shaft. Using the latter point of view, if one follows the spiral of spring 1 from the drive shaft in a direction toward the shaft to be driven, the spiral proceeds in clockwise direction $d$.

If drive shaft 2 is rotated in a counterclockwise direction $c$ which is opposite to the direction of spiral, then the same spring action will result as in the applications of forces $F_1$ and $F_2$. This action occurs because the driven shaft 3, due to inertia, tends to hold spring portion $b$ stationary at the beginning of the application of rotary motion to shaft 2, and the relative direction of the inertia force of driven shaft 3 and the force applied by the drive shaft 2 against the spring adjacent thereto is in the same direction as forces $F_1$ and $F_2$ so that spiral spring 1 tightens and contracts about both shafts 2 and 3 and rotates with the drive shaft to rotate driven shaft 3 with it.

Thus, it can be stated that if the drive shaft is rotated in a direction opposite to the direction of the twist of the spiral, a contracting of the spring occurs which transmits torque from shaft 2 to shaft 3. If the drive shaft 2 were to be suddenly stopped, then the inertia of driven shaft 3 would tend to apply a force against spiral spring 1 in a direction opposite to force $F_2$ there shown so that in such case spiral spring 1 expands and thereby is loosened from contact with shafts 2 and 3, and shaft 2 is effectively disconnected from shaft 3.

If it were desired to speed up shaft 3 relative to shaft 2 by some other source of power, this could be accomplished without affecting drive shaft 2 or the motor coupled thereto for reasons which should now be apparent. However, if it were desired to suddenly reverse the rotation of shaft 3 by a motor directly coupled thereto without coupling this motion to drive shaft 2, the spring clutch arrangement shown in Figure 2 would be inoperative to accomplish this end because any attempt to directly rotate shaft 3 in a clockwise direction would contract spiral spring 1, and a torque would be transmitted from shaft 3 to shaft 2.

It is the purpose of the instant invention to provide a clutch system such that a rotation of shaft 2 in one given direction transmits torque to shaft 3 as in Figure 2 but where rotation of shaft 3 in either direction, c or d, will not transmit a torque to shaft 2. Such a clutch system is called a one-way, uni-directional clutch.

The instant invention broadly accomplishes this latter end by providing means which will prevent the spiral spring from rotating when shaft 3 is directly rotated in a direction which would tighten spiral spring 1 to transmit torque. Thus, for example, considering shaft 3 as a drive shaft so that to use the same relative points of view as before, direction c becomes clockwise and direction d counterclockwise when one looks down shaft 2 towards (drive) shaft 3, if shaft 3 were to be turned by hand in a counterclockwise direction, d, which is opposite to the direction of spiral as viewed from the right, then spring 1 would transmit the rotary motion of shaft 3 to shaft 2 unless a braking force is applied to spiral spring 1 to prevent its rotation which is greater than the gripping force between the rotating shaft and the contracting spring.

The preferred specific embodiment of the instant invention is shown in Figure 2. A spiral spring is provided which has a portion e having a small diameter which engages shafts 2 and 3, and a portion f on the end of the spring adjacent shaft 3 which is displaced from shaft 3. Surrounding this latter section f is a fixed collar 5 which is adjacent the outer portion of section f of spring 1. If desired, a roller bearing 6 may be included in collar 5 which directly supports the driven shaft 3. A motor 7 is directly coupled to drive shaft 2, and an auxiliary motor 8 is shown directly coupled to shaft 3.

The operation of the clutch device as shown in Figure 2 is as follows:

Assuming that auxiliary motor 8 is a conventional electric motor which, when de-energized, is free-turning, and motor 7 is energized to rotate drive shaft 2 in direction c, then as in the clutch of Figure 1, portion e of spring 1 tightens about both shafts, thereby transmitting torque from shaft 2 to shaft 3. The enlarged spiral of spring 1 also contracts and is thereby removed from close contact with the collar 5. If motor 7 was suddenely stopped, spiral spring 1 would expand; and there would be no torque transmitted by shaft 2 and shaft 3. If auxiliary motor 8 were energized to rotate shaft 3 in direction c, then, for reasons explained in connection with Figure 1, spiral spring 1 would be loosened from contact with shafts 2 and 3; and there would be no motion transmitted from shaft 3 and shaft 2 since the spiral spring 1 would expand. If, on the other hand, auxiliary motor 8 would rotate shaft 3 in direction d, this would tend to contract portion e of spring 1 which normally engages shafts 2 and 3; and it would seem, at first glance, that torque would be transmitted from shaft 3 to shaft 2. However, an interesting action occurs which prevents any transmission of torque. The design of the mechanism as shown in Figure 2 is such that when shaft 3 is driven in direction d, enlarged section f of spring 1 expands rather than contracts and engages collar 5. This tightening action prevents spring 1 from rotating since the stationary inertia of spring 1, in addition to this gripping action by collar 5, overbalances the tendency of spring 1 to rotate due to the force applied thereto by the rotation of shaft 3.

Enlarged spring portion f expands under the latter conditions because the force applied by rotating shaft 3 to spring 1 directly acts only on the portion e which normally engages shaft 3 so that the relative direction of the twisting forces applied to portion f is opposite to that applied to portion e of spring 1.

The same action of the device in Figure 2 is accomplished when, instead of enlarging the diameter of spiral spring 1, the diameter of the spring is left unchanged; and, instead, the diameter of the shaft adjacent the end of spring 1 is reduced at the driven shaft end. Thus, another embodiment of the instant invention, as shown in Figure 3, includes a spiral spring 1' of fixed diameter which normally engages portions of both shafts 2 and 3'. Driven shaft 3' is reduced in cross section at 10 so that a part of the spiral spring 1' adjacent thereto is removed from the surface of the shaft.

In order to more clearly show the generic aspect of the instant invention, a third but less preferred embodiment, is shown in Figures 4 and 5. The spring 1" in this embodiment is similar to the spring shown in Figure 3 except that one end 15 of the spring adjacent the driven shaft 3 is curved outwardly to abut a lock pin 11 extending from a stationary collar 14. The action of this embodiment is as follows:

Referring to Figure 4, if shaft 2 is rotated in a clockwise direction as viewed in Figure 4, the curved outer surface 15 of the outwardly extending portion 12 of spring 1" easily slips by lock pin 11. Spring 1" then contracts and tightens against shafts 2 and 3 thereby transmitting torque from drive shaft 2 to shaft 3. When shaft 2 is rotated in counterclockwise direction as viewed in Figure 4, then the spring 1" is prevented from rotating as the outwardly extending portion 16 abuts lock pin 11. When drive shaft 3 is rotated from an external power source or is caused for any other reason to speed up relative to drive shaft 2, spring 1" expands, for the reasons previously explained; and no torque is transmitted from shaft 3 to shaft 2. If, however, drive shaft 3 is rotated by some external power source in counterclockwise direction as viewed from Figure 4, then the action of the tightening of the spring is counteracted by portion 12 which abuts lock pin 11 thereby preventing a rotation of spring 1 and the consequent transmission of torque from shaft 3 to shaft 2.

Thus, the instant invention provides a simple and effective one-way transmission clutch device.

Many modifications may be made of the specific embodiments above described without deviating from the broader aspects of the instant invention.

The invention described herein may be manufactured and used by or for the Government of the United States of America for governmental purposes without payment of any royalties thereon or therefor.

We claim:

1. A spring clutch device comprising a first drive shaft, a second shaft having a portion of the same diameter as the first shaft to be driven by said drive shaft, a spiral spring including portions of the same diameter normally engaging and disposed about the common diameter portions of said first and second shafts, fixed brake means closely surrounding the end of the spiral spring adjacent said second shaft operative upon direct rotation of said second shaft in a direction opposite to the direction of spiral of said spring to engage said spring and prevent same from rotating whereby torque is only transmitted from said first shaft to said second shaft.

2. In a uni-directional drive system including two co-axially displaced rotatable shafts having adjacent portions of the same diameter and respective motors coupled to said shafts, clutch means associated with said shafts for transmitting torque in only one direction therebetween comprising a spiral spring including portions of the same diameter normally engaging and disposed about said shafts, stationary brake means closely surrounding the end of said spring adjacent one of said shafts operative to engage the outside of and prevent said spiral spring from rotating only when said latter shaft is rotated by the said motor coupled directly thereto in a direction opposite to the direction of spiral of said spring.

3. The combination in a uni-directional drive as described comprising a first shaft, a second shaft, the two shafts having abutting portions of the same diameter, first driving means directly coupled to said first shaft for rotating it, second driving means directly coupled to said second shaft for rotating it, coupling means connected between said two shafts for coupling the rotary motion of said first shaft to said second shaft and for decoupling any rotation of said second shaft by said second driving means from said first shaft, said coupling means including a spiral spring including portions of the same diameter normally engaging and disposed about said shafts, brake means comprising a fixed support closely surrounding the end of the spiral spring adjacent said second shaft operative upon direct rotation of said second shaft in a direction opposite to the direction of the spiral of said spring to engage the outside of said spring and prevent it from rotating whereby torque is only transmitted from said first shaft to said second shaft.

4. The combination of claim 2 characterized further by said spring including a portion of larger diameter at the end nearest said second shaft displaced from said latter shaft, said braking means including a stationary collar adjacent said latter displaced spring portion for tightly engaging the outer periphery of said latter spring portion when same expands as said second shaft is directly rotated in a direction opposite to the direction of spiral of said spring.

5. A one-way drive spring clutch for insertion between two displaced coaxially related shafts of the same diameter comprising a spiral spring including a first portion of uniform diameter normally engaging the outer periphery of both of said shafts, and a second portion of larger diameter at the end of said spring adjacent the shaft to be driven offset from the latter shaft whereby said offset portion expands when an external driving force is applied to said second shaft in a direction tending to contract said spring, a relatively fixed brake means surrounding said offset portion of said spring normally in loose engagement therewith adapted to tightly engage the outer periphery of said offset portion as it expands to thereby prevent rotation thereof whereby no torque is coupled from said second shaft to said first shaft.

6. A uni-directional clutch system comprising a first shaft, a second shaft of the same diameter to be driven by said first shaft, a spiral spring having its direction of spiral opposite to the desired direction of rotation of said first shaft wound about adjacent uniform diameter portions of said first and second shafts to tightly engage said shafts as said first shaft is rotated in a direction opposite to the direction of spiral of said spring whereby torque is transmitted to said second shaft and to uncouple said shaft due to expansion of said spring as said second shaft is rotated in a direction tending to contract said spring, the end portion of the spring surrounding said second shaft being displaced outwardly from said second shaft whereby said spring end expands as said second shaft is rotated by an external force in a direction tending to contract said spring, and a stationary collar normally in loose engagement with outer periphery of the said latter end of said spring but sized to tightly grip said end portion of said spring upon expansion thereof to prevent it from rotating whereby torque is transmitted only from first shaft to said second shaft in one direction.

References Cited in the file of this patent
UNITED STATES PATENTS

| | | |
|---|---|---|
| 2,486,149 | Gorske | Oct. 25, 1949 |
| 2,622,450 | Forske | Dec. 23, 1952 |